(12) United States Patent
Kelley

(10) Patent No.: US 10,332,068 B2
(45) Date of Patent: Jun. 25, 2019

(54) SYSTEMS AND METHODS FOR STOCKING AN AUTOMOBILE

(71) Applicant: CDK Global, LLC, Hoffman Estates, IL (US)

(72) Inventor: Stephen Kelley, Fort Lauderdale, FL (US)

(73) Assignee: CDK GLOBAL, LLC, Hoffman Estates, IL (US)

( * ) Notice: Subject to any disclaimer, the term of this patent is extended or adjusted under 35 U.S.C. 154(b) by 248 days.

(21) Appl. No.: 15/134,820

(22) Filed: Apr. 21, 2016

(65) Prior Publication Data

US 2017/0308844 A1    Oct. 26, 2017

(51) Int. Cl.
*G06Q 10/08* (2012.01)

(52) U.S. Cl.
CPC .................. *G06Q 10/087* (2013.01)

(58) Field of Classification Search
None
See application file for complete search history.

(56) References Cited

U.S. PATENT DOCUMENTS

| | | |
|---|---|---|
| 4,992,940 A | 2/1991 | Dworkin |
| 5,421,015 A | 5/1995 | Khoyi et al. |
| 5,521,815 A | 5/1996 | Rose, Jr. |
| 5,649,186 A | 7/1997 | Ferguson |
| 5,694,595 A | 12/1997 | Jacobs et al. |
| 5,787,177 A | 7/1998 | Leppek |
| 5,790,785 A | 8/1998 | Klug et al. |
| 5,835,712 A | 11/1998 | Dufresne |
| 5,845,299 A | 12/1998 | Arora et al. |
| 5,862,346 A | 1/1999 | Kley et al. |
| 5,911,145 A | 6/1999 | Arora et al. |
| 5,956,720 A | 9/1999 | Fernandez et al. |
| 5,974,149 A | 10/1999 | Leppek |
| 5,974,418 A | 10/1999 | Blinn et al. |
| 5,974,428 A | 10/1999 | Gerard et al. |
| 5,978,776 A | 11/1999 | Seretti et al. |
| 5,987,506 A | 11/1999 | Carter et al. |
| 6,003,635 A | 12/1999 | Bantz et al. |
| 6,006,201 A | 12/1999 | Berent et al. |
| 6,009,410 A | 12/1999 | Lemole et al. |
| 6,018,748 A | 1/2000 | Smith |
| 6,021,416 A | 2/2000 | Dauerer et al. |

(Continued)

OTHER PUBLICATIONS

Java version history—Wikipedia, the free encyclopedia, printed Mar. 6, 2010, 9 pgs.

(Continued)

*Primary Examiner* — Fateh M Obaid
(74) *Attorney, Agent, or Firm* — Stoel Rives LLP

(57) ABSTRACT

The present disclosure provides systems and methods for stocking an automobile. Stocking the automobile can include reading the location of the automobile in an electronic memory, comparing, via one or more processors, the location of the automobile with the location of the dealership to determine whether the automobile has arrived at the dealership, and notifying, via a network interface, the stocking system that the automobile has arrived at the dealership. Stocking the automobile can also include receiving a notification, via the network interface, from the dealership that the automobile is checked-in.

20 Claims, 9 Drawing Sheets

(56) References Cited

U.S. PATENT DOCUMENTS

| | | | |
|---|---|---|---|
| 6,021,426 | A | 2/2000 | Douglis et al. |
| 6,026,433 | A | 2/2000 | D'Arlach et al. |
| 6,041,310 | A | 3/2000 | Green et al. |
| 6,041,344 | A | 3/2000 | Bodamer et al. |
| 6,055,541 | A | 4/2000 | Solecki et al. |
| 6,061,698 | A | 5/2000 | Chadha et al. |
| 6,067,559 | A | 5/2000 | Allard et al. |
| 6,070,164 | A | 5/2000 | Vagnozzi |
| 6,134,532 | A | 10/2000 | Lazarus et al. |
| 6,151,609 | A | 11/2000 | Truong |
| 6,178,432 | B1 | 1/2001 | Cook et al. |
| 6,185,614 | B1 | 2/2001 | Cuomo et al. |
| 6,189,104 | B1 | 2/2001 | Leppek |
| 6,219,667 | B1 | 4/2001 | Lu et al. |
| 6,236,994 | B1 | 5/2001 | Schwartz et al. |
| 6,289,382 | B1 | 9/2001 | Bowman-Amuah |
| 6,295,061 | B1 | 9/2001 | Park et al. |
| 6,343,302 | B1 | 1/2002 | Graham |
| 6,353,824 | B1 | 3/2002 | Boguraev et al. |
| 6,374,241 | B1 | 4/2002 | Lamburt et al. |
| 6,397,226 | B1 | 5/2002 | Sage |
| 6,397,336 | B2 | 5/2002 | Leppek |
| 6,401,103 | B1 | 6/2002 | Ho et al. |
| 6,421,733 | B1 | 7/2002 | Tso et al. |
| 6,473,849 | B1 | 10/2002 | Keller et al. |
| 6,496,855 | B1 | 12/2002 | Hunt et al. |
| 6,505,205 | B1 | 1/2003 | Kothuri et al. |
| 6,519,617 | B1 | 2/2003 | Wanderski et al. |
| 6,535,879 | B1 | 3/2003 | Behera |
| 6,539,370 | B1 | 3/2003 | Chang et al. |
| 6,546,216 | B2 | 4/2003 | Mizoguchi et al. |
| 6,553,373 | B2 | 4/2003 | Boguraev et al. |
| 6,556,904 | B1 | 4/2003 | Larson et al. |
| 6,564,216 | B2 | 5/2003 | Waters |
| 6,571,253 | B1 | 5/2003 | Thompson et al. |
| 6,581,061 | B2 | 6/2003 | Graham |
| 6,583,794 | B1 | 6/2003 | Wattenberg |
| 6,594,664 | B1 | 7/2003 | Estrada et al. |
| 6,606,525 | B1 | 8/2003 | Muthuswamy et al. |
| 6,629,148 | B1 | 9/2003 | Ahmed et al. |
| 6,643,663 | B1 | 11/2003 | Dabney et al. |
| 6,654,726 | B1 | 11/2003 | Hanzek |
| 6,678,706 | B1 | 1/2004 | Fishel |
| 6,697,825 | B1 | 2/2004 | Underwood et al. |
| 6,721,747 | B2 | 4/2004 | Lipkin |
| 6,728,685 | B1 | 4/2004 | Ahluwalia |
| 6,738,750 | B2 | 5/2004 | Stone et al. |
| 6,785,864 | B1 | 8/2004 | Te et al. |
| 6,795,819 | B2 | 9/2004 | Wheeler et al. |
| 6,823,359 | B1 | 11/2004 | Heidingsfeld |
| 6,826,594 | B1 | 11/2004 | Pettersen |
| 6,847,988 | B2 | 1/2005 | Toyouchi et al. |
| 6,871,216 | B2 | 3/2005 | Miller et al. |
| 6,901,430 | B1 | 5/2005 | Smith |
| 6,917,941 | B2 | 7/2005 | Wight et al. |
| 6,922,674 | B1 | 7/2005 | Nelson |
| 6,944,677 | B1 | 9/2005 | Zhao |
| 6,963,854 | B1 | 11/2005 | Boyd et al. |
| 6,965,968 | B1 | 11/2005 | Touboul |
| 6,978,273 | B1 | 12/2005 | Bonneau et al. |
| 6,981,028 | B1 | 12/2005 | Rawat et al. |
| 6,990,629 | B1 | 1/2006 | Heaney et al. |
| 7,000,184 | B2 | 2/2006 | Matveyenko et al. |
| 7,028,072 | B1 | 4/2006 | Kliger et al. |
| 7,031,554 | B2 | 4/2006 | Iwane |
| 7,039,704 | B2 | 5/2006 | Davis et al. |
| 7,047,318 | B1 | 5/2006 | Svedloff |
| 7,062,506 | B2 | 6/2006 | Taylor et al. |
| 7,072,943 | B2 | 7/2006 | Landesmann |
| 7,107,268 | B1 | 9/2006 | Zawadzki et al. |
| 7,124,116 | B2 | 10/2006 | Huyler |
| 7,152,207 | B1 | 12/2006 | Underwood et al. |
| 7,155,491 | B1 | 12/2006 | Schultz et al. |
| 7,171,418 | B2 | 1/2007 | Blessin |
| 7,197,764 | B2 | 3/2007 | Cichowlas |
| 7,219,234 | B1 | 5/2007 | Ashland et al. |
| 7,240,125 | B2 | 7/2007 | Fleming |
| 7,246,263 | B2 | 7/2007 | Skingle |
| 7,281,029 | B2 | 10/2007 | Rawat |
| 7,322,007 | B2 | 1/2008 | Schowtka et al. |
| 7,386,786 | B2 | 6/2008 | Davis et al. |
| 7,401,289 | B2 | 7/2008 | Lachhwani et al. |
| 7,433,891 | B2 | 10/2008 | Haber et al. |
| 7,496,543 | B1 | 2/2009 | Bamford et al. |
| 7,536,641 | B2 | 5/2009 | Rosenstein et al. |
| 7,548,985 | B2 | 6/2009 | Guigui |
| 7,587,504 | B2 | 9/2009 | Adams et al. |
| 7,593,925 | B2 | 9/2009 | Cadiz et al. |
| 7,624,342 | B2 | 11/2009 | Matveyenko et al. |
| 7,657,594 | B2 | 2/2010 | Banga et al. |
| 7,747,680 | B2 | 6/2010 | Ravikumar et al. |
| 7,778,841 | B1 | 8/2010 | Bayer et al. |
| 7,801,945 | B1 | 9/2010 | Geddes et al. |
| 7,861,309 | B2 | 12/2010 | Spearman et al. |
| 7,865,409 | B1 | 1/2011 | Monaghan |
| 7,870,253 | B2 | 1/2011 | Muilenburg et al. |
| 7,979,506 | B2 * | 7/2011 | Cole .............. G06Q 10/083 705/28 |
| 8,051,159 | B2 | 11/2011 | Muilenburg et al. |
| 8,055,544 | B2 | 11/2011 | Ullman et al. |
| 8,209,259 | B2 | 6/2012 | Graham, Jr. et al. |
| 8,271,473 | B2 | 9/2012 | Berg |
| 8,271,547 | B2 | 9/2012 | Taylor et al. |
| 8,275,717 | B2 | 9/2012 | Ullman et al. |
| 8,355,950 | B2 | 1/2013 | Colson et al. |
| 8,438,310 | B2 | 5/2013 | Muilenburg et al. |
| 8,538,894 | B2 | 9/2013 | Ullman et al. |
| 8,645,193 | B2 | 2/2014 | Swinson et al. |
| 9,754,304 | B2 | 9/2017 | Taira et al. |
| 9,836,714 | B2 * | 12/2017 | Lander .............. G06Q 10/08 |
| 2001/0037332 | A1 | 11/2001 | Miller et al. |
| 2001/0039594 | A1 | 11/2001 | Park et al. |
| 2001/0054049 | A1 | 12/2001 | Maeda et al. |
| 2002/0023111 | A1 | 2/2002 | Arora et al. |
| 2002/0026359 | A1 | 2/2002 | Long et al. |
| 2002/0032626 | A1 | 3/2002 | Dewolf et al. |
| 2002/0032701 | A1 | 3/2002 | Gao et al. |
| 2002/0042738 | A1 | 4/2002 | Srinivasan et al. |
| 2002/0046245 | A1 | 4/2002 | Hillar et al. |
| 2002/0049831 | A1 | 4/2002 | Platner et al. |
| 2002/0059260 | A1 | 5/2002 | Jas |
| 2002/0065739 | A1 | 5/2002 | Florance et al. |
| 2002/0069110 | A1 | 6/2002 | Sonnenberg |
| 2002/0073080 | A1 | 6/2002 | Lipkin |
| 2002/0082978 | A1 | 6/2002 | Ghouri et al. |
| 2002/0091755 | A1 | 7/2002 | Narin |
| 2002/0107739 | A1 | 8/2002 | Schlee |
| 2002/0116418 | A1 | 8/2002 | Lachhwani et al. |
| 2002/0123359 | A1 | 9/2002 | Wei et al. |
| 2002/0124053 | A1 | 9/2002 | Adams et al. |
| 2002/0129054 | A1 | 9/2002 | Ferguson et al. |
| 2002/0138331 | A1 | 9/2002 | Hosea et al. |
| 2002/0143646 | A1 | 10/2002 | Boyden et al. |
| 2002/0154146 | A1 | 10/2002 | Rodriquez et al. |
| 2002/0169851 | A1 | 11/2002 | Weathersby et al. |
| 2002/0196273 | A1 | 12/2002 | Krause |
| 2002/0198761 | A1 | 12/2002 | Ryan et al. |
| 2002/0198878 | A1 | 12/2002 | Baxter et al. |
| 2003/0014443 | A1 | 1/2003 | Bernstein et al. |
| 2003/0023632 | A1 | 1/2003 | Ries et al. |
| 2003/0033378 | A1 | 2/2003 | Needham et al. |
| 2003/0036964 | A1 | 2/2003 | Boyden et al. |
| 2003/0037263 | A1 | 2/2003 | Kamat et al. |
| 2003/0046179 | A1 | 3/2003 | Anabtawi et al. |
| 2003/0051022 | A1 | 3/2003 | Sogabe et al. |
| 2003/0061263 | A1 | 3/2003 | Riddle |
| 2003/0065532 | A1 | 4/2003 | Takaoka |
| 2003/0069785 | A1 | 4/2003 | Lohse |
| 2003/0069790 | A1 | 4/2003 | Kane |
| 2003/0074392 | A1 | 4/2003 | Campbell et al. |
| 2003/0115292 | A1 | 6/2003 | Griffin et al. |
| 2003/0120502 | A1 | 6/2003 | Robb et al. |
| 2003/0145310 | A1 | 7/2003 | Thames et al. |
| 2003/0177050 | A1 | 9/2003 | Crampton et al. |

(56) References Cited

U.S. PATENT DOCUMENTS

| | | |
|---|---|---|
| 2003/0177175 A1 | 9/2003 | Worley et al. |
| 2003/0225853 A1 | 12/2003 | Wang et al. |
| 2003/0229623 A1 | 12/2003 | Chang et al. |
| 2003/0233246 A1 | 12/2003 | Snapp et al. |
| 2004/0012631 A1 | 1/2004 | Skorski |
| 2004/0039646 A1 | 2/2004 | Hacker |
| 2004/0041818 A1 | 3/2004 | White et al. |
| 2004/0073546 A1 | 4/2004 | Forster et al. |
| 2004/0073564 A1 | 4/2004 | Haber et al. |
| 2004/0088228 A1 | 5/2004 | Mercer et al. |
| 2004/0128320 A1 | 7/2004 | Grove et al. |
| 2004/0139203 A1 | 7/2004 | Graham, Jr. et al. |
| 2004/0148342 A1 | 7/2004 | Cotte |
| 2004/0156020 A1 | 8/2004 | Edwards |
| 2004/0163047 A1 | 8/2004 | Nagahara et al. |
| 2004/0181464 A1 | 9/2004 | Vanker et al. |
| 2004/0220863 A1 | 11/2004 | Porter et al. |
| 2004/0225664 A1 | 11/2004 | Casement |
| 2004/0230897 A1 | 11/2004 | Latzel |
| 2004/0255233 A1 | 12/2004 | Croney et al. |
| 2004/0267263 A1 | 12/2004 | May |
| 2004/0268225 A1 | 12/2004 | Walsh et al. |
| 2004/0268232 A1 | 12/2004 | Tunning |
| 2005/0015491 A1 | 1/2005 | Koeppel |
| 2005/0065804 A1 | 3/2005 | Worsham et al. |
| 2005/0096963 A1 | 5/2005 | Myr et al. |
| 2005/0108112 A1 | 5/2005 | Ellenson et al. |
| 2005/0114270 A1 | 5/2005 | Hind et al. |
| 2005/0114764 A1 | 5/2005 | Gudenkauf et al. |
| 2005/0108637 A1 | 6/2005 | Sahota et al. |
| 2005/0171836 A1 | 8/2005 | Leacy |
| 2005/0228736 A1 | 10/2005 | Norman et al. |
| 2005/0267774 A1 | 12/2005 | Merritt et al. |
| 2005/0268282 A1 | 12/2005 | Laird |
| 2005/0289020 A1 | 12/2005 | Bruns et al. |
| 2005/0289599 A1 | 12/2005 | Matsuura et al. |
| 2006/0031811 A1 | 2/2006 | Ernst et al. |
| 2006/0059253 A1 | 3/2006 | Goodman et al. |
| 2006/0064637 A1 | 3/2006 | Rechterman et al. |
| 2006/0123330 A1 | 6/2006 | Horiuchi et al. |
| 2006/0129423 A1 | 6/2006 | Sheinson et al. |
| 2006/0129982 A1 | 6/2006 | Doyle |
| 2006/0161841 A1 | 7/2006 | Horiuchi et al. |
| 2006/0200751 A1 | 9/2006 | Underwood et al. |
| 2006/0248442 A1 | 11/2006 | Rosenstein et al. |
| 2006/0265355 A1 | 11/2006 | Taylor |
| 2006/0271844 A1 | 11/2006 | Suklikar |
| 2006/0277588 A1 | 12/2006 | Harrington et al. |
| 2007/0005446 A1 | 1/2007 | Fusz et al. |
| 2007/0016486 A1 | 1/2007 | Stone et al. |
| 2007/0033520 A1 | 2/2007 | Kimzey et al. |
| 2007/0053513 A1 | 3/2007 | Hoffberg |
| 2007/0150368 A1 | 6/2007 | Arora et al. |
| 2007/0209011 A1 | 9/2007 | Padmanabhuni et al. |
| 2007/0250327 A1 | 10/2007 | Hedy |
| 2007/0271154 A1 | 11/2007 | Broudy et al. |
| 2007/0271330 A1 | 11/2007 | Mattox et al. |
| 2007/0271389 A1 | 11/2007 | Joshi et al. |
| 2007/0282711 A1 | 12/2007 | Ullman et al. |
| 2007/0282712 A1 | 12/2007 | Ullman et al. |
| 2007/0282713 A1 | 12/2007 | Ullman et al. |
| 2007/0288413 A1 | 12/2007 | Mizuno et al. |
| 2007/0294192 A1 | 12/2007 | Tellefsen |
| 2008/0015929 A1 | 1/2008 | Koeppel et al. |
| 2008/0027827 A1 | 1/2008 | Eglen et al. |
| 2008/0172632 A1 | 7/2008 | Stambaugh |
| 2008/0195435 A1 | 8/2008 | Bentley et al. |
| 2008/0195932 A1 | 8/2008 | Oikawa et al. |
| 2008/0201163 A1 | 8/2008 | Barker et al. |
| 2009/0012887 A1 | 1/2009 | Taub et al. |
| 2009/0024918 A1 | 1/2009 | Silverbrook et al. |
| 2009/0043780 A1 | 2/2009 | Hentrich, Jr. et al. |
| 2009/0070435 A1 | 3/2009 | Abhyanker |
| 2009/0112687 A1* | 4/2009 | Blair .................. G06Q 30/02 705/7.29 |
| 2009/0182232 A1 | 7/2009 | Zhang et al. |
| 2009/0204454 A1 | 8/2009 | Lagudi |
| 2009/0222532 A1 | 9/2009 | Finlaw |
| 2009/0265607 A1 | 10/2009 | Raz et al. |
| 2009/0313035 A1 | 12/2009 | Esser et al. |
| 2010/0082778 A1 | 4/2010 | Muilenburg et al. |
| 2010/0082780 A1 | 4/2010 | Muilenburg et al. |
| 2010/0088158 A1* | 4/2010 | Pollack .................. G06Q 30/02 705/7.35 |
| 2010/0100506 A1 | 4/2010 | Marot |
| 2010/0312608 A1 | 12/2010 | Shan et al. |
| 2010/0318408 A1 | 12/2010 | Sankaran et al. |
| 2011/0022525 A1 | 1/2011 | Swinson et al. |
| 2011/0082804 A1 | 4/2011 | Swinson et al. |
| 2011/0145064 A1 | 6/2011 | Anderson et al. |
| 2011/0161167 A1 | 6/2011 | Jallapuram |
| 2011/0191264 A1 | 8/2011 | Inghelbrecht et al. |
| 2011/0196762 A1 | 8/2011 | Dupont |
| 2011/0307411 A1 | 12/2011 | Bolivar et al. |
| 2012/0209714 A1 | 8/2012 | Douglas et al. |
| 2012/0278886 A1 | 11/2012 | Luna |
| 2014/0026037 A1 | 1/2014 | Garb et al. |
| 2014/0094992 A1* | 4/2014 | Lambert ................ G07C 5/008 701/1 |
| 2014/0278805 A1 | 9/2014 | Thompson |
| 2014/0337163 A1 | 11/2014 | Whisnant |
| 2015/0278886 A1 | 10/2015 | Fusz |
| 2016/0071054 A1 | 3/2016 | Kakarala et al. |
| 2016/0140622 A1 | 5/2016 | Wang et al. |
| 2017/0308864 A1 | 10/2017 | Kelley |
| 2017/0308865 A1 | 10/2017 | Kelley |
| 2018/0285901 A1 | 10/2018 | Zackrone |
| 2018/0285925 A1 | 10/2018 | Zackrone |

OTHER PUBLICATIONS

Lee, Adam J. et al., "Searching for Open Windows and Unlocked Doors: Port Scanning in Large-Scale Commodity Custers," Cluster Computing and the Grid, 2005. CCGrid 2005. IEEE International Symposium on vol. 1; Publication Year: 2005.

Michener, J.R., et al., "Managing System and Active-Content Integrity," Computer; vol. 33, Issue: 7; Publication Year 2000, pp. 108-110.

Milic-Frayling, Natasa, et al., "SmartView: Enhanced Document Viewer for Mobile Devices," Google Nov. 15, 2002, 11 pgs.

Non-Final Office Action for U.S. Appl. No. 10/350,795, filed Jan. 24, 2003, and mailed from the USPTO dated Dec. 26, 2008, 13 pgs.

Non-Final Office Action for U.S. Appl. No. 10/350,795, filed Jan. 24, 2003, and mailed from the USPTO dated Feb. 6, 2006, 11 pgs.

Non-Final Office Action for U.S. Appl. No. 10/350,795, filed Jan. 24, 2003, and mailed from the USPTO dated Jul. 22, 2009, 22 pgs.

Non-Final Office Action for U.S. Appl. No. 10/350,795, filed Jan. 24, 2003, and mailed from the USPTO dated Jun. 29, 2006, 11 pgs.

Non-Final Office Action for U.S. Appl. No. 10/350,795, filed Jan. 24, 2003, and mailed from the USPTO dated Mar. 12, 2007, 10 pgs.

Non-Final Office Action for U.S. Appl. No. 10/350,795, filed Jan. 24, 2003, and mailed from the USPTO dated May 29, 2008, 10 pgs.

Non-Final Office Action for U.S. Appl. No. 10/350,795, filed Jan. 24, 2003, and mailed from the USPTO dated Nov. 1, 2010, 19 pgs.

Non-Final Office Action for U.S. Appl. No. 10/350,796, filed Jan. 24, 2003 and mailed from the USPTO dated May 19, 2005, 7 pgs.

Non-Final Office Action for U.S. Appl. No. 10/350,810, filed Jan. 24, 2003, and mailed from the USPTO dated Apr. 17, 2007, 12 pgs.

Non-Final Office Action for U.S. Appl. No. 10/350,810, filed Jan. 24, 2003, and mailed from the USPTO dated Dec. 9, 2005, 14 pgs.

Non-Final Office Action for U.S. Appl. No. 10/350,810, filed Jan. 24, 2003, and mailed from the USPTO dated Sep. 22, 2004, 10 pgs.

Non-Final Office Action for U.S. Appl. No. 10/351,465, filed Jan. 24, 2003, and mailed from the USPTO dated Jul. 27, 2004, 9 pgs.

Non-final Office Action for U.S. Appl. No. 10/351,606, filed Jan. 24, 2003 and mailed from the USPTO dated Dec. 19, 2005, 7 pgs.

Non-final Office Action for U.S. Appl. No. 10/351,606, filed Jan. 24, 2003 and mailed from the USPTO dated May 17, 2004, 5 pgs.

(56) References Cited

OTHER PUBLICATIONS

Non-Final Office Action for U.S. Appl. No. 10/665,899, filed Sep. 18, 2003, and mailed from the USPTO dated Aug. 30, 2010, 23 pgs.
Non-Final Office Action for U.S. Appl. No. 10/665,899, filed Sep. 18, 2003, and mailed from the USPTO dated Nov. 13, 2008, 11 pgs.
Non-Final Office Action for U.S. Appl. No. 10/665,899, filed Sep. 18, 2003, and mailed from the USPTO datedSep. 14, 2009, 14 pgs.
Non-Final Office Action for U.S. Appl. No. 10/665,899, filed Sep. 18, 2003, and mailed from the USPTO dated Sep. 17, 2007, 11 pgs.
Non-Final Office Action for U.S. Appl. No. 11/149,909, filed Jun. 10, 2005, and mailed from the USPTO dated May 13, 2008, 14 pgs.
Non-Final Office Action for U.S. Appl. No. 11/149,909 filed Jun. 10, 2005, and mailed from the USPTO dated May 6, 2009, 6 pgs.
Von-Final Office Action for U.S. Appl. No. 11/414,939, filed May 1, 2006, and mailed from the USPTO dated Jul. 19, 2010, 7 pgs.
Non-Final Office Action for U.S. Appl. No. 11/414,939, filed May 1, 2006, and mailed from the USPTO dated Mar. 9, 2010, 11 pgs.
Non-Final Office Action for U.S. Appl. No. 11/442,821, filed May 30, 2006, and mailed from the USPTO dated Jun. 1, 2011, 23 pgs.
Non-Final Office Action for U.S. Appl. No. 11/442,821, filed May 30, 2006, and mailed from the USPTO dated Nov. 12, 2009, 19 pgs.
Non-Final Office Action for U.S. Appl. No. 11/442,821, filed May 30, 2006, and mailed from the USPTO dated Sep. 3, 2008, 14 pgs.
Non-Final Office Action for U.S. Appl. No. 11/446,011, filed Jun. 2, 2006, and mailed from the USPTO dated Mar. 1, 2011, 15 pgs.
Non-Final Office Action for U.S. Appl. No. 11/446,011, filed Jun. 2, 2006, and mailed from the USPTO dated Nov. 27, 2009, 14 pgs.
Non-Final Office Action for U.S. Appl. No. 11/524,602, filed Sep. 21, 2006, and mailed from the USPTO dated Dec. 11, 2009, 20 pgs.
Non-Final Office Action for U.S. Appl. No. 11/524,602, filed Sep. 21, 2006, and mailed from the USPTO dated Nov. 4, 2011, 19 pgs.
Non-Final Office Action for U.S. Appl. No. 11/525,009, filed Sep. 21, 2006, and mailed from the USPTO dated Aug. 10, 2011, 18 pgs.
Non-Final Office Action for U.S. Appl. No. 11/525,009, filed Sep. 21, 2006, and mailed from the USPTO dated Dec. 16, 2009, 20 pgs.
Non-Final Office Action for U.S. Appl. No. 12/243,852, filed Oct. 1, 2008, and mailed from the USPTO dated Jan. 16, 2013, 5 pgs.
Non-Final Office Action for U.S. Appl. No. 12/243,852, filed Oct. 1, 2008, and mailed from the USPTO dated Mar. 17, 2011, 8 pgs.
Non-Final Office Action for U.S. Appl. No. 12/243,855, filed Oct. 1, 2008, and mailed from the USPTO dated Oct. 14, 2010, 6 pgs.
Non-Final Office Action for U.S. Appl. No. 12/243,861, filed Oct. 1, 2008, and mailed from the USPTO dated Nov. 8, 2010, 8 pgs.
Non-Final Office Action for U.S. Appl. No. 13/025,019, filed Feb. 10, 2011, and mailed from the USPTO dated Apr. 22, 2016, 16 pgs.
Non-Final Office Action for U.S. Appl. No. 13/025,019, filed Feb. 10, 2011, and mailed from the USPTO dated Apr. 5, 2013, 15 pgs.
Mon-Final Office Action for U.S. Appl. No. 13/025,019, filed Feb. 10, 2011, and mailed from the USPTO dated Oct. 6, 2017, 17 pgs.
Non-Final Office Action for U.S. Appl. No. 13/025,019, filed Feb. 10, 2011, and mailed from the USPTO dated Sep. 8, 2014, 15 pgs.
Non-Final Office Action for U.S. Appl. No. 14/208,042, filed Mar. 13, 2014, and mailed from the USPTO dated Jun. 30, 2016, 23 pgs.
Non-Final Office Action for U.S. Appl. No. 14/208,042, filed Mar. 13, 2014, and mailed from the USPTO dated Sep. 20, 2017.
Non-Final Office Action for U.S. Appl. No. 15/602,999, filed May 23, 2017, and mailed from the USPTO dated May 3, 2018.
Non-Final Office Action dated Oct. 6, 2017 in U.S. Appl. No. 13/025,019.
Notice of Allowance and Fee(s) Due for U.S. Appl. No. 10/350,795, filed Jan. 24, 2003, and mailed from the USPTO dated May 7, 2012, 15 pgs.
Notice of Allowance and Fee(s) Due for U.S. Appl. No. 10/350,796, filed Jan. 24, 2003 and mailed from the USPTO dated Feb. 1, 2006, 5 pgs.
Notice of Allowance and Fee(s) Due for U.S. Appl. No. 10/350,810, filed Jan. 24, 2003, and mailed from the USPTO dated Apr. 14, 2008, 6 pgs.

Notice of Allowance and Fee(s) Due for U.S. Appl. No. 10/351,465, filed Jan. 24, 2003, and mailed from the USPTO dated Sep. 21, 2005, 4 pgs.
Notice of Allowance and Fee(s) Due for U.S. Appl. No. 10/351,606, filed Jan. 24, 2003 and mailed from the USPTO dated Apr. 4, 2006, 8 pgs.
Notice of Allowance and Fee(s) Due for U.S. Appl. No. 11/149,909, filed Jun. 10, 2005, and mailed from the USPTO dated Sep. 16, 2009, 7 pgs.
Notice of Allowance and Fee(s) Due for U.S. Appl. No. 11/414,939, filed May 1, 2006, and mailed from the USPTO dated Nov. 2, 2010, pgs.
Notice of Allowance and Fee(s) Due for U.S. Appl. No. 11/442,821, filed May 30, 2006, and mailed from the USPTO dated Jul. 30, 2012, 6 pgs.
Notice of Allowance arid Fee(s) Due for U.S. Appl. No. 11/446,011, filed Jun. 2, 2006, and mailed from the USPTO dated Aug. 9, 2011, 10 pgs.
Notice of Allowance and Fee(s) Due for U.S. Appl. No. 11/524,602, filed Sep. 21, 2006, and mailed from the USPTO dated Aug. 6, 2013, 22 pgs.
Notice of Allowance and Fee(s) Due for U.S. Appl. No. 11/525,009, filed Sep. 21, 2006, and mailed from the USPTO dated Jul. 23, 2012, 19 pgs.
Notice of Allowance and Fee(s) Due for U.S. Appl. No. 12/243,852, filed Oct. 1, 2008, and mailed from the USPTO dated Feb. 27, 2013, 6 pgs.
Notice of Allowance and Fee(s) Due for U.S. Appl. No. 12/243,855, filed Oct. 1, 2008, and mailed from the USPTO Nov. 22, 2010, 8 pgs.
Notice of Allowance and Fee(s) Due for U.S. Appl. No. 12/243,855, filed Oct. 1, 2008, and mailed from the USPTO Oct. 28, 2010, 5 pgs.
Nlotice of Allowance and Fee(s) Due for U.S. Appl. No. 12/243,861, filed Oct. 1, 2008, and mailed from the USPTO Sep. 6, 2011, 10 pgs.
Notice of Non-compliant Amendment dated Dec. 12, 2006 in U.S. Appl. No. 10/350,810.
Permissions in the Java™ 2 SDK, printed Mar. 6, 2010, 45 pgs.
Restriction Requirement for U.S. Appl. No. 12/243,852, filed Oct. 1, 2008, and mailed from the USPTO dated Dec. 7, 2010.
Strebe, Matthew et al. MCSE: NT Server 4 Study Guide, Third Edition. 2000, SYBEX Inc. Front matter, pp. 284-293, and 308-347 are included. Entire book cited, 36 pgs.
Supplemental Notice of Allowability for U.S. Appl. No. 12/243,852, filed Oct. 1, 2008, and mailed from the USPTO dated Mar. 19, 2013, 3 pgs.
Trademark Electronic Search System record for Serial Number 7637505, Word Mark "NITRA".
Trademark Application, Serial number 76375405. 13 pages of advertising material and other application papers enclosed. Available from Trademark Document Retrieval system.
"NetFormx Offers Advanced Network Discovery Software". PR Newswire. Mar. 15, 1999. Retrieved from http://www.highbeam.com/doc/1G1-54102907.html>.
Advisory Action for U.S. Appl. No. 14/208,042, filed Mar. 13, 2014, and mailed from the USPTO dated Jul. 12, 2018.
Aloisio, Giovanni et al., "Web-based access to the Grid using the Grid Resource Broker portal," Google 2002, pp. 1145-1160.
Anonymous, "Software ready for prime time." Automotive News. Detroit, Nov. 5, 2001. vol. 76, Issue 5996, p. 28.
Chadwick, D. W., "Understanding X.500—The Directory." Available at <http://sec.cs.kent.ac.uk/x500book/>. 1996. Entire work cited.
Chen, Deren, "Business to Business Standard and Supply Chain System Framework in Virtual Enterprises," Computer Supported Cooperative Work in Design, The Sixth International Conference on, 2001; Publication Year. 2001, pp. 472-476.
CNY Business Journal, "Frank La Voila named Southern Tier Small-Business Person of 1999". Jun. 11, 1999. 2 pgs.
Davis, Peter T. et al., "Sams Teach Yourself Microsoft Windows NT Server 4 in 21 Days," Sams® Publishing, ®1999. ISBN: 0-672-31555-6, 15 pgs., printed Dec. 21, 2008.

(56) References Cited

OTHER PUBLICATIONS

Derfler, Frank J. et al., "How Networks Work: Millennium Edition," Que, A Division of Macmillan Computer Publishing, ® 2000. ISBN: 0-7897-2445-6, 9 pgs.
Final Office Action for U.S. Appl. No. 10/350,795, filed Jan. 24, 2003, and mailed from the USPTO dated Jul. 6, 2011, 26 pgs.
Final Office Action for U.S. Appl. No. 10/350,795, filed Jan. 24, 2003, and mailed from the USPTO dated Mar. 3, 2010, 24 pgs.
Final Office Action for U.S. Appl. No. 10/350,810, filed Jan. 24, 2003, and mailed from the USPTO dated Apr. 5, 2005, 12 pgs.
Final Office Action for U.S. Appl. No. 10/350,810, filed Jan. 24, 2003, and mailed from the USPTO dated May 18, 2006, 15 pgs.
Final Office Action for U.S. Appl. No. 10/350,810, filed Jan. 24, 2003, and mailed from the USPTO dated Nov. 14, 2007, 13 pgs.
Final Office Action for U.S. Appl. No. 10/351,465, filed Jan. 24, 2003, and mailed from the USPTO dated May 5, 2005, 8 pgs.
Final Office Action for U.S. Appl. No. 10/665,899, filed Sep. 18, 2003, and mailed from the USPTO dated Feb. 24, 2010, 22 pgs.
Final Office Action for U.S. Appl. No. 10/665,899, filed Sep. 18, 2003, and mailed from the USPTO dated Jul. 7, 2008, 11 pgs.
Final Office Action for U.S. Appl. No. 10/665,899, filed Sep. 18, 2003, and mailed from the USPTO dated Mar. 8, 2011, 21 pgs.
Final Office Action for U.S. Appl. No. 10/665,899, filed Sep. 18, 2003, and mailed from the USPTO dated May 11, 2009, 14 pgs.
Final Office Action for U.S. Appl. No. 11/149,909, filed Jun. 10, 2005, and mailed from the USPTO dated Feb. 4, 2009, 14 pgs.
Final Office Action for U.S. Appl. No. 11/442,821, filed May 30, 2006, and mailed from the USPTO dated Apr. 7, 2009, 19 pgs.
Final Office Action for U.S. Appl. No. 11/442,821, filed May 30, 2006, and mailed from the USPTO dated May 21, 2010, 28 pgs.
Final Office Action for U.S. Appl. No. 11/442,821, filed May 30, 2006, and mailed from the USPTO dated Nov. 29, 2011, 26 pgs.
Final Office Action for U.S. Appl. No. 11/446,011, filed Jun. 2, 2006, and mailed from the USPTO dated Jun. 8, 2010, 12 pgs.
Final Office Action for U.S. Appl. No. 11/524,602, filed Sep. 21, 2006, and mailed from the USPTO dated Jul. 27, 2010, 13 pgs.
Final Office Action for U.S. Appl. No. 11/524,602, filed Sep. 21, 2006, and mailed from the USPTO dated Jun. 26, 2012, 11 pgs.
Final Office Action for U.S. Appl. No. 11/525,009, filed Sep. 21, 2006, and mailed from the USPTO dated Aug. 3, 2010, 16 pgs.
Final Office Action for U.S. Appl. No. 12/243,852, filed Oct. 1, 2008, and mailed from the USPTO dated Oct. 24, 2011, 13 pgs.
Final Office Action for U.S. Appl. No. 12/243,861, filed Oct. 1, 2008, and mailed from the USPTO dated Jun. 22, 2011, 5 pgs.
Final Office Action for U.S. Appl. No. 13/025,019, filed Feb. 10, 2011, and mailed from the USPTO dated Aug. 28, 2015, 25 pgs.
Final Office Action for U.S. Appl. No. 13/025,019, filed Feb. 10, 2011, and mailed from the USPTO dated Jul. 13, 2018, 11 pgs.
Internet Archive: Democracy Now, http://www.archive.org/audio/collection.php?collection=democracy_now, printed Mar. 12, 2004, 2 pgs.
Final Office Action for U.S. Appl. No. 13/025,019, filed Feb. 10, 2011, and mailed from the USPTO dated Sep. 12, 2013, 13 pgs.
Final Office Action for U.S. Appl. No. 13/025,019, filed Feb. 20, 2011, and mailed from the USPTO dated Dec. 20, 2016, 16 pgs.
Final Office Action for U.S. Appl. No. 14/208,042, filed Mar. 13, 2014, and mailed from the USPTO dated Jan. 11, 2019, 16 pgs.
Final Office Action for U.S. Appl. No. 14/208,042, filed Mar. 13, 2014, and mailed from the USPTO dated Apr. 16, 2018.
Final Office Action for U.S. Appl. No. 14/208,042, filed Mar. 13, 2014, and mailed from the USPTO dated Dec. 6, 2016, 26 pgs.
Internet Archive Wayback Machine, archive of LDAP Browser.com—Product Info. Archived Dec. 11, 2000. Available at <http://web.archive.org/web/200012110541/http://www.ldapbrowser.com/prodinfo/prodinfo.php3?sID=fe4ae66f2fo23d86909f35e974f3a1ce>.
Final Office Action for U.S. Appl. No. 15/602,999, filed May 23, 2017, and mailed from the USPTO dated Nov. 21, 2018.
Hogue et al., "Thresher: Automating the Unwrapping of Semantic Content from the World Wide Web," ACM 2005, pp. 86-95.
Housel, Barron C. et al., "WebExpress: A client/intercept based system for optimizing Web browsing in a wireless environment," Google 1998, pp. 419-431.
http://web.archive.org/web/20010718130244/http://chromedata.com/maing2/about/index.asp, 1 pg.
http://web.archive.org/web/20050305055408/http://www.dealerclick.com/, 1 pg.
http://web.archive.org/web/20050528073821/http://www.kbb.com/, 1 pg.
http://web.archive.org/web/20050531000823/http://www.carfax.com/, 1 pg.
IBM Tivoli Access Manager Base Administration Guide, Version 5.1. 2003, International Business Machines Corporation. Entire book enclosed and cited. 402 pgs.
Interconnection. (2003). In Roget's II the New Thesaurus. Boston, MA: Houghton Mifflin. Retrieved Jul. 16, 2009, from http://www.credoreference.com/entry/hmrogets/interconnection, 1 pg.
Internet Archive: Audio Archive, http://www.archive.org/audio/audio-searchresults.php?search=@star=0&limit=100&sort=ad, printed May 12, 2004, 12 pgs.
Internet Archive: Democracy Now, http://www.archive.org/audio/collection.php?collection=democracy_now, printed May 12, 2004, 2 pgs.
Java 2 Platform, Enterprise Edition (J2EE) Overview, printed Mar. 6, 2010, 3 pgs.

* cited by examiner

```
                                    ┌─ 760
```

Reading The Location Of The Automobile In The Electronic Memory
762

Comparing, Via The One Or More Processors, The Location Of The Automobile With The Location Of The Dealership To Determine Whether The Automobile Has Arrived At The Dealership
764

Notifying, Via The Network Interface, The Stocking System That The Automobile Has Arrived At The Dealership
766

Receiving A Notification, Via The Network Interface, From The Dealership That The Automobile Is Checked-in
768

┌─────────────────────────────────────────────────────────┐
  │ Receiving, Via A Network Interface, A Location Of The   │
  │ Automobile, Wherein The Automobile Provided The Location│
  │                          872                            │
  └─────────────────────────────────────────────────────────┘

┌─────────────────────────────────────────────────────────┐
  │ Determining Whether The Automobile Is Within A Perimeter│
  │ Based On The Location Of The Automobile                 │
  │                          874                            │
  └─────────────────────────────────────────────────────────┘

┌─────────────────────────────────────────────────────────┐
  │ Notifying, Via A Network Interface, A Dealership That   │
  │ The Automobile Is Within The Perimeter                  │
  │                          876                            │
  └─────────────────────────────────────────────────────────┘

┌─────────────────────────────────────────────────────────┐
  │ Receiving A Notification, Via The Network Interface,    │
  │ From The Dealership That The Automobile Is Checked-in   │
  │                          878                            │
  └─────────────────────────────────────────────────────────┘
```

┌─────────────────────────────────────────────────────────┐
    │ Receiving, Via One Or More Access Points Of A Wireless  │
    │        Local Area Network (WLAN) Operating On           │
    │  The Premises Of The Dealership, A Request To Connect   │
    │              An Automobile To The WLAN                  │
    │                          982                            │
    └─────────────────────────────────────────────────────────┘

┌─────────────────────────────────────────────────────────┐
    │ Identifying The Automobile Based On The Request To      │
    │         Connect The Automobile To The WLAN              │
    │                          984                            │
    └─────────────────────────────────────────────────────────┘

┌─────────────────────────────────────────────────────────┐
    │ Determining Whether The Identified Automobile Is In     │
    │                Stock At The Dealership                  │
    │                          986                            │
    └─────────────────────────────────────────────────────────┘

┌─────────────────────────────────────────────────────────┐
    │ Stocking-in The Automobile Based On A Determination     │
    │  That The Automobile Is Not In Stock At The Dealership  │
    │                          988                            │
    └─────────────────────────────────────────────────────────┘
```

FIG. 9

SYSTEMS AND METHODS FOR STOCKING AN AUTOMOBILE

TECHNICAL FIELD

This application relates to systems and methods for stocking an automobile.

SUMMARY

The present disclosure provides systems and methods for stocking an automobile. Stocking the automobile can include reading the location of the automobile in an electronic memory, comparing, via one or more processors, the location of the automobile with the location of the dealership to determine whether the automobile has arrived at the dealership, and notifying, via a network interface, the stocking system that the automobile has arrived at the dealership. Stocking the automobile can also include receiving a notification, via the network interface, from the dealership that the automobile is checked in.

In another example, stocking the automobile can include receiving, via a network interface, a location of the automobile, wherein the automobile provides the location, determining whether the automobile is within a perimeter based on the location of the automobile, and notifying, via a network interface, a dealership that the automobile is within the perimeter. Stocking the automobile can also include receiving a notification, via the network interface, from the dealership that the automobile is checked-in.

In yet another example, stocking the automobile can include receiving, via one or more access points of a wireless local area network (WLAN) operating on the premises of the dealership, a request to connect an automobile to the WLAN, identifying the automobile based on the request to connect the automobile to the WLAN, and determining whether the identified automobile is in stock at the dealership. Stocking the automobile can also include stocking-in the automobile based on a determination that the automobile is not in stock at the dealership.

BRIEF DESCRIPTION OF THE DRAWINGS

FIG. 7 is a flowchart of a method for stocking an automobile according to one embodiment.

FIG. 8 is a flowchart of a method for stocking an automobile according to one embodiment.

FIG. 9 is a flowchart of a method for stocking an automobile according to one embodiment.

DETAILED DESCRIPTION OF PREFERRED EMBODIMENTS

Figure 1:
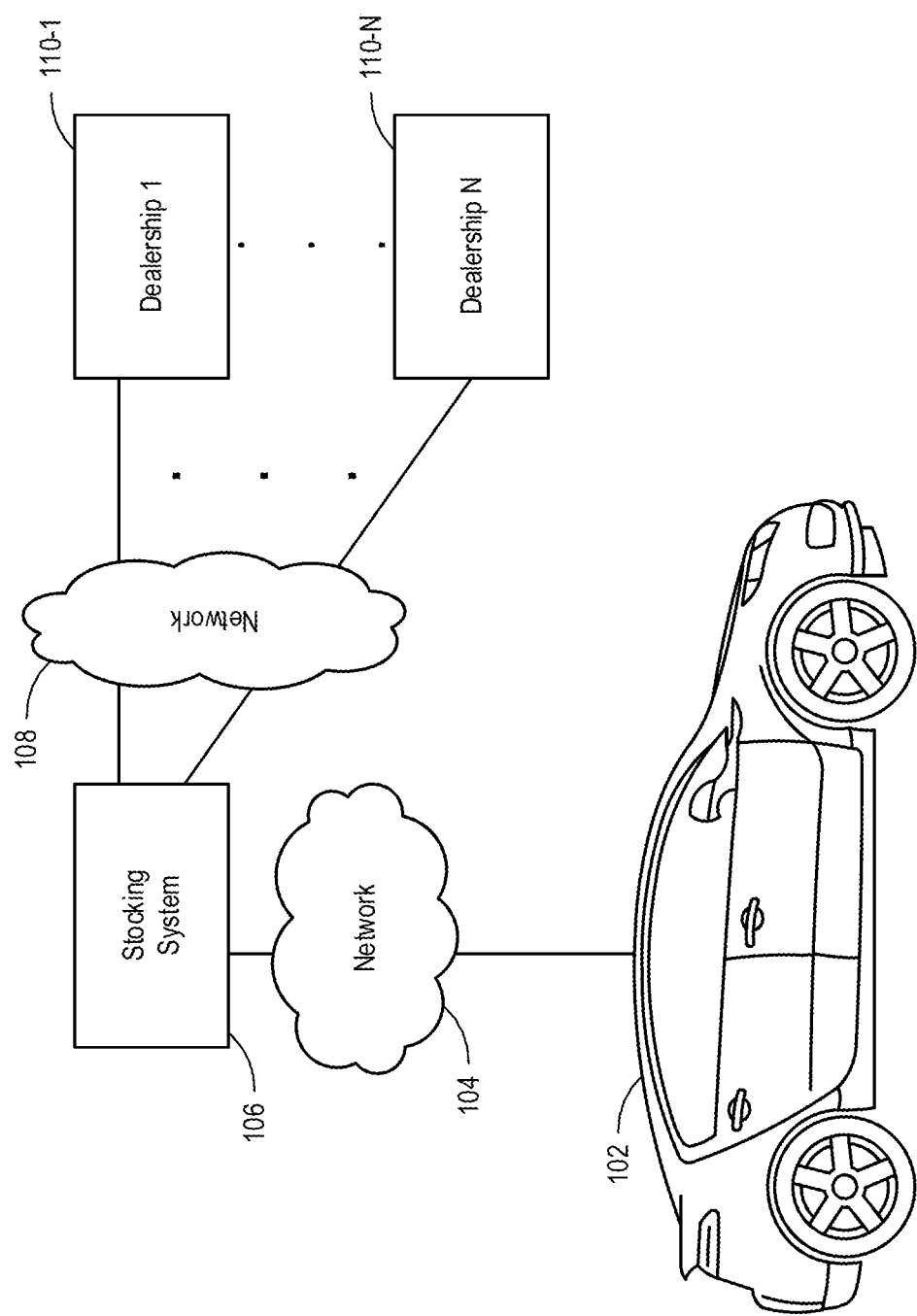
FIG. 1 is a system diagram of a stocking system according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Stocking an automobile can include receiving the automobile and adding the automobile to an inventory. Stocking an automobile can also include adding the automobile to a list of inventory (e.g., inventory list).

In a number of previous approaches, stocking an automobile can include providing a human user access to the automobile to verify that the automobile is in the premise of a dealership. Providing the user access to the automobile can incur the cost and the time of the user going to each automobile to verify that the automobile is on the premises.

Stocking an automobile can also include the user physically adding the automobile to an inventory by driving the received automobile to an inventory location where the inventory of automobiles is stored. Driving the automobile to an inventory location can also incur costs and time associated with paying a user to transfer the car from a receipt location to a storage location.

Stocking an automobile can also include the user physically adding the automobile to the inventory list. Physically adding the automobile to an inventory list can include a user writing and/or electronically including the automobile in a ledger and/or database. Physically adding the automobile to the inventory includes the cost of paying a user to perform the labor and the time used in physically adding the automobile to the inventory list. Additional costs can include the cost of transitioning between each of the above previous approaches to stocking an automobile.

As used herein, a dealership can include a legal entity and/or a physical structure. A physical structure can include a storage location, a place of business, office space, and/or a perimeter. A legal entity can be a new car dealership, a used car dealership, and/or any entity created to store automobiles for any interval of time. For example, a dealership can include a car rental entity and/or a bicycle rental entity. A dealership can include a central location and/or offsite locations. For example, a dealership can include a location of a business and/or a plurality of satellite locations of a business.

An automobile can include any vehicle used for transportation. For example, an automobile can be a car, a bus, a truck, and/or a motorcycle. The use of the term automobile is also intended to include bicycles, boats, and/or airplanes, among other types of transportation.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies. The network may include a wireless network.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, or other protocols over twisted pair, coaxial, or optical fiber cables, telephone lines, radio waves, satellites, microwave relays, modulated AC power lines, physical media transfer, and/or other data transmission "wires" and/or wireless protocols known to those of skill in the art. The network may encompass smaller networks and/or be connectable to other networks through a gateway or similar mechanism.

Each computer system includes at least a processor and a memory; computer systems may also include various input devices and/or output devices. The processor may include a general-purpose device, such as an Intel®, AMD®, or other "off-the-shelf" microprocessor. The processor may include a special-purpose processing device, such as an ASIC, a SoC, a SiP, an FPGA, a PAL, a PLA, an FPLA, a PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, a tape drive, an optical drive, a magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general-purpose computers, computer programming tools and techniques, computer networks and networking technologies, digital storage media, authentication, access control, and other security tools and techniques provided by public keys, encryption, firewalls, and/or other means.

FIG. 1 is a system diagram of a stocking system according to one embodiment. FIG. 1 includes an automobile 102, a network 104, a stocking system 106, a network 108, and dealerships 110-1 to 110-N (referred to generally as dealerships 110).

Although FIG. 1 illustrates an automobile 102, a different type of vehicle can be implemented herein as described above. For example, an automobile 102 can represent a motorcycle, a boat, and/or a different type of vehicle.

The networks 104 and 108 can be a same network or different networks. For example, the scheduling system can employ an intranet as the network 104 or 108 to communicate with the dealerships 110 and/or an internet as the network 104 or 108 to communicate with the dealerships 110.

The dealerships 110 can receive automobiles including automobile 102. The dealerships 110 can be independently owned dealerships and/or dealerships that are part of a chain of dealerships, among other types of dealerships.

Each of the dealerships 110 can request, purchase, and/or acquire automobiles such as automobile 102. The dealerships 110 can schedule the receipt of an automobile. The dealerships 110 may automatically stock the automobile 102 once the automobile is delivered to the dealerships 110. Automatically stocking the automobile 102 can include adding the automobile 102 to an inventory after delivery without requiring that a user physically update the inventory list.

The stocking system 106 can include a plurality of computing devices configured to add the automobile 102 to an inventory list of at least one of the dealerships 110. For example, the stocking system 106 can include a computing device for receiving an indication that the automobile 102 is at the dealership. The stocking system 106 can also update an inventory list of at least one of the dealerships 110.

Each of the computing devices of a stocking system 106 can include one or more processors, electronic memory, and/or a network interface, among other components used by the computing device. The electronic memory is accessible by the one or more processors. The electronic memory can store the inventory lists of each of the dealerships 110, a plurality of attributes of the dealerships 110, and/or a plurality of attributes of automobiles such as automobile 102. A network interface may be enabled to provide communication with the automobile 102. At least one of the computing device may include a stocking application stored in the electronic memory and configured by the one or more processors, to stock an automobile 102.

In one example, the automobile 102 can be delivered to one of the dealerships 110. The automobile 102 can be delivered to one of the dealerships 110 based on a purchase agreement between the one of the dealerships 110 and a manufacturer of the automobile 102 and/or based upon a different agreement. For example, the automobile 102 can be returned by a client to one of the dealerships 110. In a number of examples, one of the dealerships 110 can expect delivery of the automobile 102.

The automobile 102 can communicate with the stocking system 106 via a network 104. The automobile 102 can communicate with the stocking system 106 to inform the stocking system 106 that the automobile 102 has arrived at one of the dealerships 110.

The automobile 102 can provide data to the stocking system 106 to verify that the automobile 102 is at one of the dealerships 110. For example, the automobile 102 can provide a global positioning system (GPS) coordinate that is within a predetermined distance from one of the dealerships 110. The automobile 102 can interact with one of the dealerships 110 in such a way that it can convey to the stocking system 106 that the automobile 102 is at one of the dealerships 110. For example, the automobile 102 can communicate with the stocking system 106 via the network 104 which includes a WLAN of a corresponding dealership.

In a number of embodiments, the dealerships 110 can determine that the automobile 102 is at their location and the dealerships 110 can inform the stocking system 106 that the automobile 102 has arrived.

The stocking system 106 can determine whether the automobile 102 is scheduled to arrive at a particular dealership from the dealerships 110. For example, the automobile 102 is scheduled to be delivered to the dealership 110-1. As such, the dealership 110-1 expects the automobile 102 to be delivered to its location. However, the automobile 102 may be delivered to the dealership 110-N. The stocking system 106 can determine whether the automobile 102 is delivered at a scheduled location or whether the automobile 102 is delivered at an incorrect dealership (e.g., location).

The stocking system 106 can maintain a record of the delivery schedules for each of the dealerships 110. For example, the stocking system 106 can query at least one of the dealerships 110 and/or receive from at least one of the dealerships 110 a delivery schedule at predefined intervals of time.

In some embodiments, the stocking system 106 can also access the delivery schedules stored at the dealerships 110. For example, the stocking system 106 may access the delivery schedules stored at the dealerships 110 to cross reference the delivery schedules stored at the stocking system 106. The stocking system 106 can access the delivery schedules stored at the dealerships 110 in response to receiving an indication from the automobile 102 and/or the dealerships 110 that the automobile 102 is at a particular dealership.

The stocking system 106 can determine whether the automobile 102 is at a dealership which was expecting the delivery of the automobile 102. The stocking system 106 can determine whether the automobile 102 is in fact at one of the dealerships 110.

Based on a determination that the automobile 102 is not at one of the dealerships 110 and/or that the automobile 102 is not at a dealership that is scheduled to receive the automobile 102, the stocking system 106 can inform a dealership that was scheduled to receive the automobile 102 of the automobile's location and/or of possible delays. The stocking system 106 can also reschedule the delivery of the automobile 102 from its current location to the correct dealership. The stocking system 106 can update a delivery schedule stored at the stocking system 106 and/or at the correct dealership (e.g., one of the dealerships 110).

Based on a determination that the automobile 102 is at a dealership that is scheduled to receive the automobile 102, the stocking system 106 can inform the dealership of the arrival of the automobile 102 at the dealership. The stocking system 106 can update a delivery schedule. Updating the delivery schedule can include removing the scheduled delivery of the automobile 102 from the delivery schedule. The stocking system can also add the automobile 102 to the inventory list.

Figure 2:
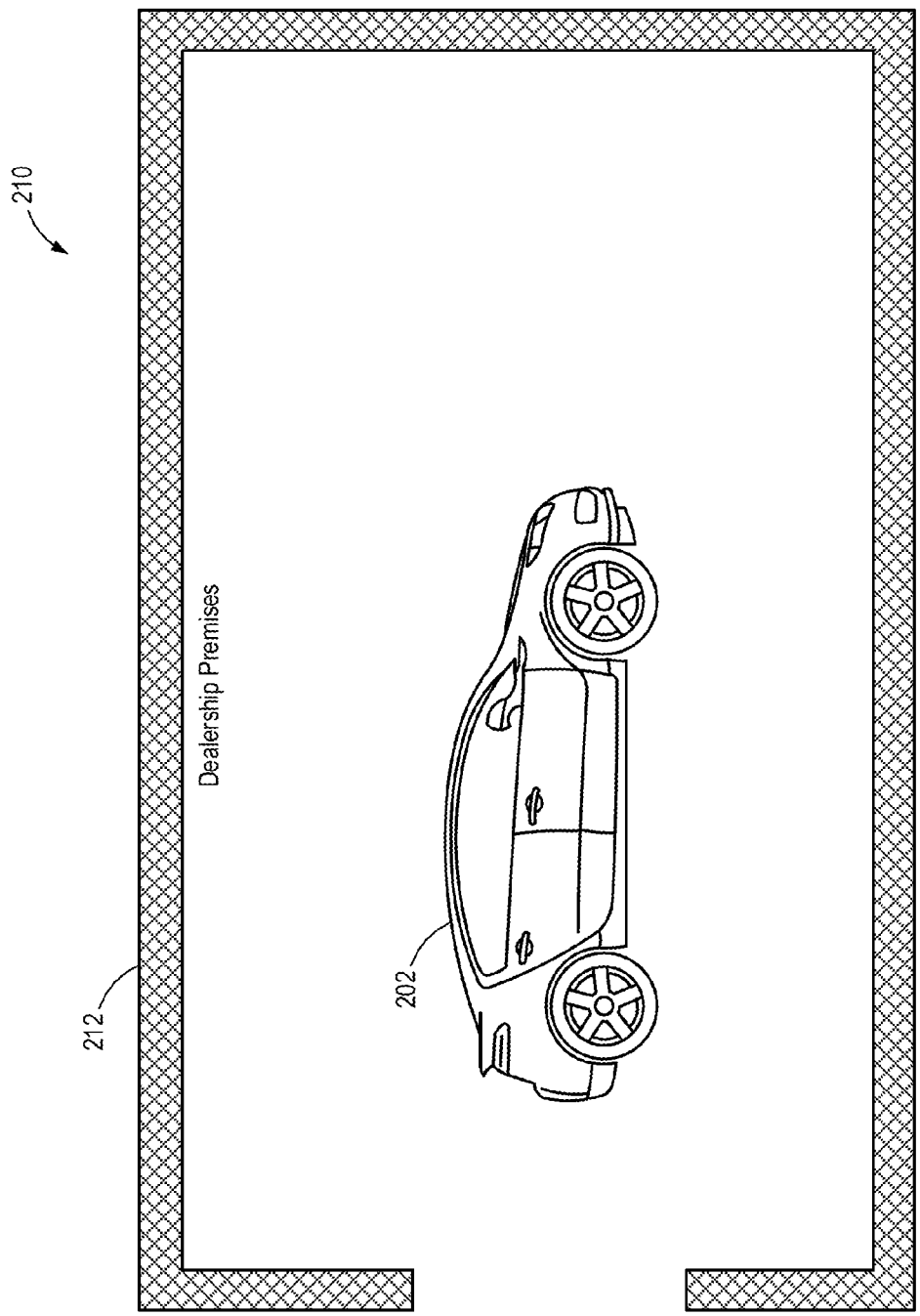
FIG. 2 is a system diagram of an automobile in a dealership's premises according to one embodiment.

In a number of embodiments, the dealerships 110 can receive a notice from the stocking system 106 that the automobile 102 has arrived at the dealerships 110. The dealerships 110 may desire to process the automobile 102. As such, the dealerships 110 may inform the stocking system 106 of the acceptance of the automobile 102. The stocking system 106 may add the automobile to the inventory list FIG. 2 is a system diagram of an automobile on a dealership's premises 212 according to one embodiment. FIG. 2 includes an automobile 202, a dealership 210, and a dealership's premises 212. The automobile 202 is analogous to automobile 102 in FIG. 1.

As previously discussed, the automobile 202 can inform the stocking system of the automobile's 202 arrival at the dealership 210. The arrival of the automobile 202 at the dealership 210 can be determined based on the location of the automobile 202 and/or the dealership premises 212.

In a number of examples, the dealership premises 212 can be defined by the dealership 210 and provided to the stocking system. The dealership premises 212 can be defined based on a plurality of points, such as a plurality of GPS points. The dealership premises 212 can be defined based on a single point such as a single GPS point. For example, the dealership premises 212 can be defined as a circumference around a GPS point which defines the location of the dealership 210.

The plurality of points that define the dealership premises 212 can include a physical construct of the dealership 210. For example, the dealership premises 212 can be defined based on the boundaries surrounding the dealership 210. The boundary can be a physical boundary and/or a non-physical boundary. For example, the boundary can be a fence, a land feature, and/or lot dimensions.

In FIG. 2, the dealership premises 212 is a geo-fence. The geo-fence uses GPS and/or radio frequency identifiers (RFID) to define a geographical boundary. The geo-fence can activate an interaction with a number of devices based on the triggering of the geo-fence. For example, the geo-fence can determine that the automobile 202 is within the premises 212 of the dealership 210. The geo-fence can provide a notice to the stocking system of the location of the automobile 202 within the geo-fence and/or the geo-fence can interact with a communication device of the automobile 202 to cause the communication device of the automobile 202 to provide the automobile's 202 location to the stocking system.

Upon receiving the automobile's 202 location, the stocking system can compare the automobile's 202 location to the location of the dealership premises 212 which includes a plurality of GPS coordinates to define a boundary of the dealership 210. The stocking system can then determine whether the automobile 202 is within the dealership premises 212 and continue to stock the automobile 202 at the dealership 210.

Figure 3:
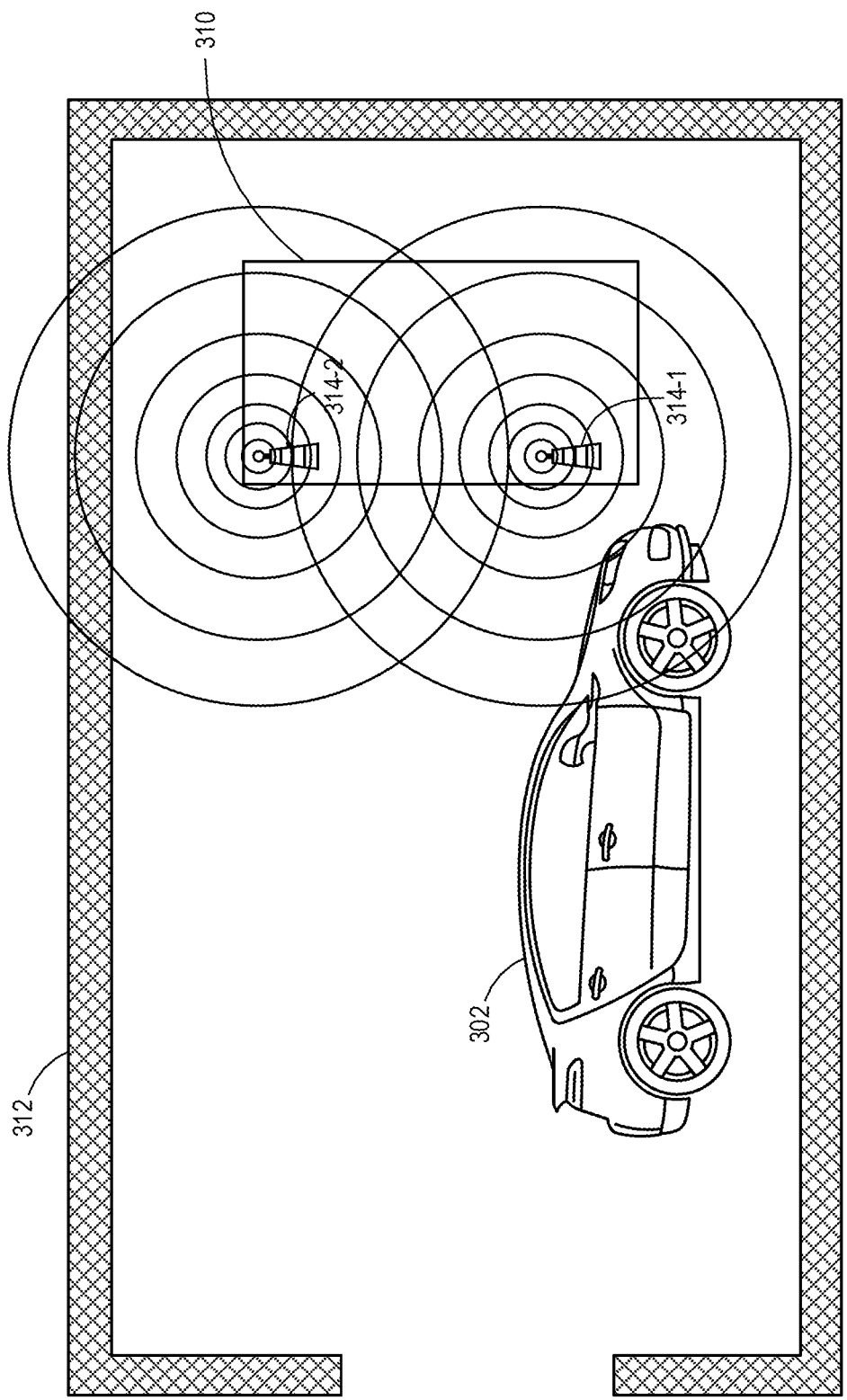
FIG. 3 is a system diagram of an automobile interacting with a dealership's wireless local area network (WLAN) according to one embodiment.

FIG. 3 is a system diagram of an automobile interacting with a dealership's wireless local area network (WLAN) according to one embodiment. FIG. 3 includes an automobile 302, a dealership 310, dealership premises 312, and access points 314-1, 314-2 (e.g., referred to generally as access points 314) of a WLAN of the dealership 310.

The automobile 302 can be delivered at the dealership 310 within the dealership premises 312. The automobile 302 can connect to at least one of the access points 314 to communicate with the stocking system.

The automobile 302 can communicate with the stocking system periodically during the delivery, allowing the stocking system to determine the progress of the delivery of the automobile 302. The automobile 302 can communicate with the stocking system using a cellular connection, a WiFi connection, and/or a different type of connection.

In FIG. 3, the automobile 302 can connect to the WLAN using the access points 314 via a WiFi connection. The communications between the automobile 302 and/or the stocking system can include an identification of the access points 314 and/or the WLAN of the dealerships 310. The identification of the access points 314 and/or the WLAN of the dealerships 310 can be conveyed in header information of the communications and/or in the body of the communications.

The stocking system can receive the communications from the automobile 302 and determine that the communications were provided via the access points 314 and/or the WLAN of the dealership 310. As such, the stocking system can determine that the automobile 302 is at the dealership 310.

Figure 4:
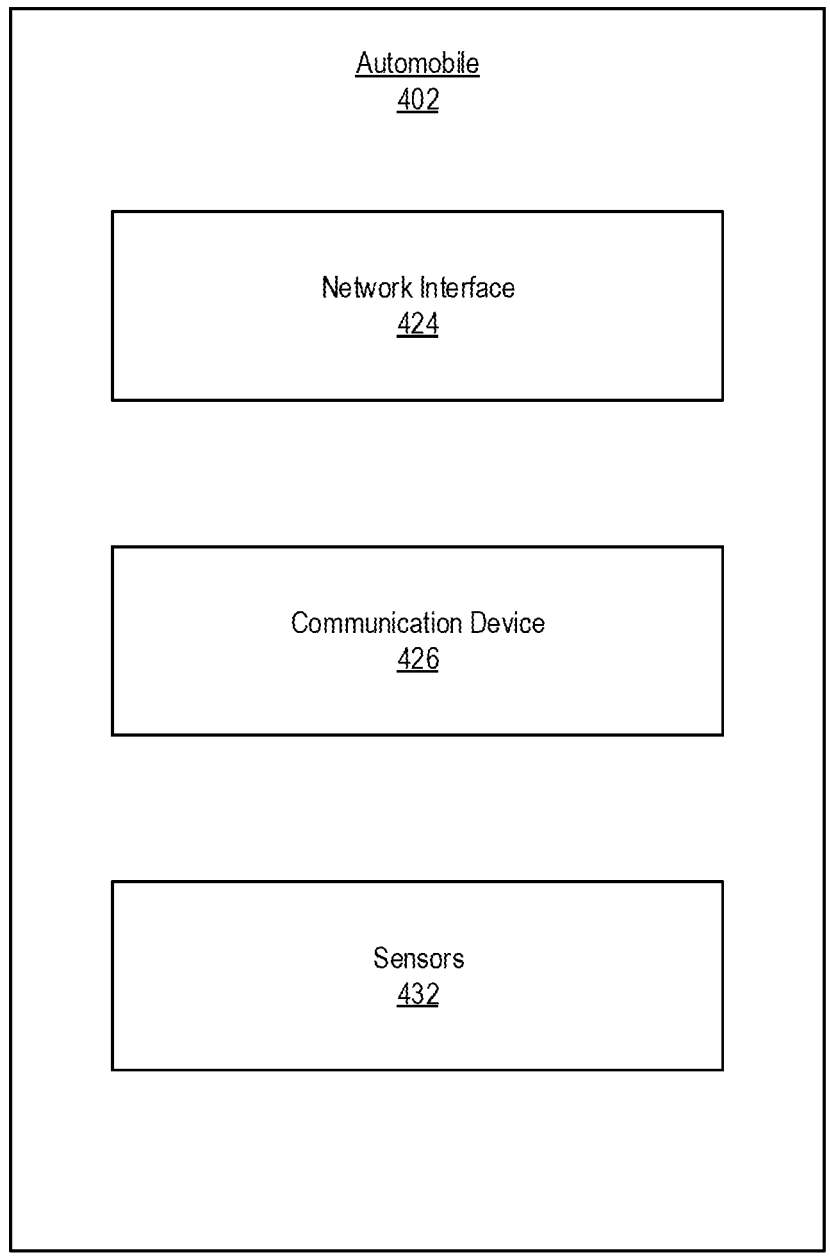
FIG. 4 is a block diagram of an automobile according to one embodiment.

FIG. 4 is a block diagram of an automobile according to one embodiment. The automobile 402 includes a network interface 424 and a communication device 426, among other components of the automobile 402. Although not shown, the automobile 402 can also include memory to store a location of the automobile 402. For example, the memory can be independent of the communication device 426 and/or integrated into the communication device 426.

The network interface 424 can include hardware and/or computer readable instructions to communicate with the stocking system. The network interface 424 can also be used to communicate with a dealership, a dealership premises, and/or other components of the dealership such as an access point of the dealership WLAN.

The network interface 424 can include an antenna for wireless communications. The network interface 424 can receive data and send data via a network (e.g., networks 104, 108 in FIG. 1). The network interface 424 can provide communication to the communication device 426. The network interface 424 can send communications from the communication device 426.

The communications can be initiated by the communication device 426. The communication device 426 includes hardware and/or computer readable instructions to provide a location of the automobile 402 to the stocking system. The communication device 426 is further described in FIG. 4.

The sensors 432 can include a plurality of sensors that provide data on the automobile's 402 location. The sensors 432 can monitor the actions taken by the automobile 402. For example, the sensors 432 can monitor the automobile's 402 speed and/or the revolutions per minute (RPM) of the automobile 402, among other actions taken by the automobile 402. The sensors 432 can include GPS sensors and/or a RFID sensors. The sensors 432 can also provide data other than a GPS coordinate and/or an RFID coordinate that can be used to determine a location of the automobile 402.

Figure 5:
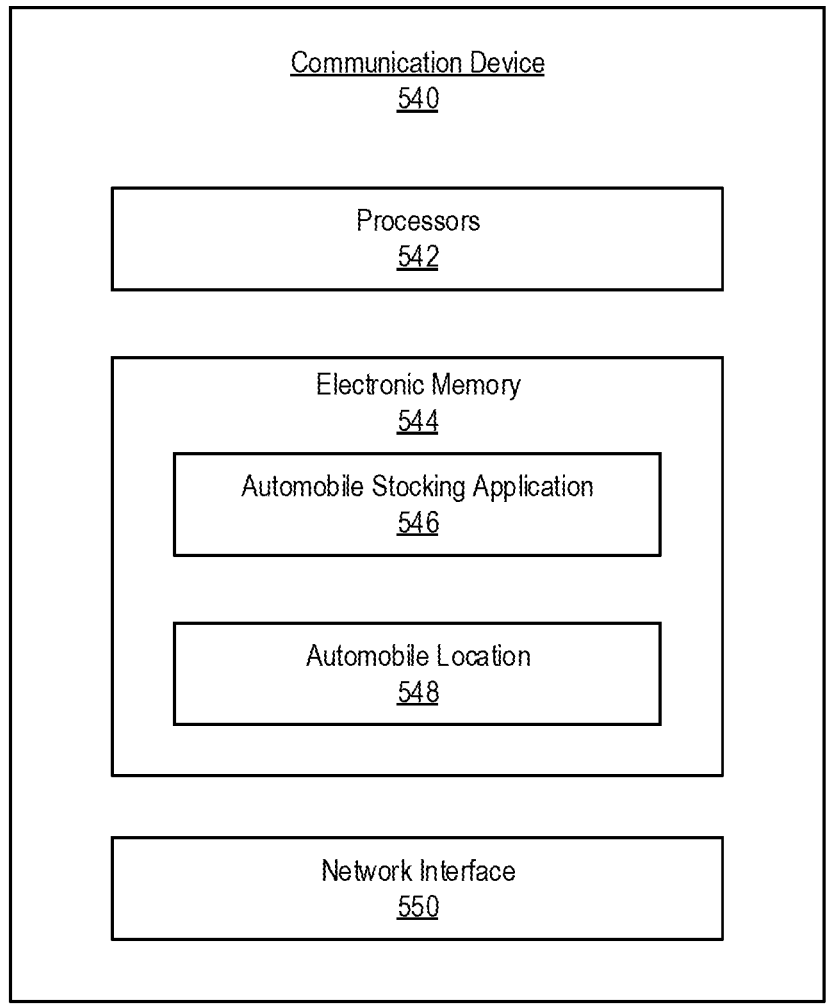
FIG. 5 is a block diagram of a communication device according to one embodiment.

FIG. 5 is a block diagram of a communication device according to one embodiment. The communication device 540 includes one or more processors 542, electronic memory 544, and a network interface 550. The electronic memory 544 includes an automobile stocking application 546 and an automobile location 548 as provided by a plurality of sensors of the automobile.

The one or more processors 542 can be independent of any other processors that are a part of the automobile (e.g., automobile 402 in FIG. 4). The network interface 550 can be independent of network interface 424 in FIG. 4. In a number of examples, the network interface 550 can be analogous to network interface 424 in FIG. 4. The network interface 550 enables communication with one or more computing devices including a computing device of the stocking system (e.g., stocking system 106 in FIG. 1). The network interface 550 may be configured to connect to the Internet (e.g., the World Wide Web) via a WiFi connection and/or a cellular connection, among other connection types.

The automobile location 548 can be created by the sensors and stored in the electronic memory 544. The automobile stocking application 546 can be executed by the processors 542 to report a location of the automobile to the stocking system.

The automobile stocking application 546 can be configured to read the location of the automobile stored in the electronic memory. The automobile stocking application 546 can also be configured to provide, via the network interface 550, the automobile location 548.

In a number of examples, the automobile location 548 can be reported without a dealership's intervention. That is, the location of the automobile can be reported by the automobile, particularly by automobile stocking application 546 in the communication device 540. The dealership may be informed of the automobile's location after the automobile stocking application 546 has reported the automobile's location to the stocking system.

In some embodiments, the communication device 540 can be integrated into the automobile. That is, the communication device 540 can be permanently coupled to the automobile. For example, the communication device 540 may be an original equipment manufacturer (OEM) part of the automobile.

The communication device 540 can also be a mobile communication device that can be coupled to the automobile via a WiFi connection. That is, the communication device 540 can communicate with the automobile via the WiFi connection, among other types of connections. In some embodiments, the communication device 540 can be coupled to the automobile via an on-board diagnostics (OBD) port. As such, a user of the automobile may be able to plug the communication device 540 into the automobile and unplug the communication device 540 from the automobile.

Figure 6:
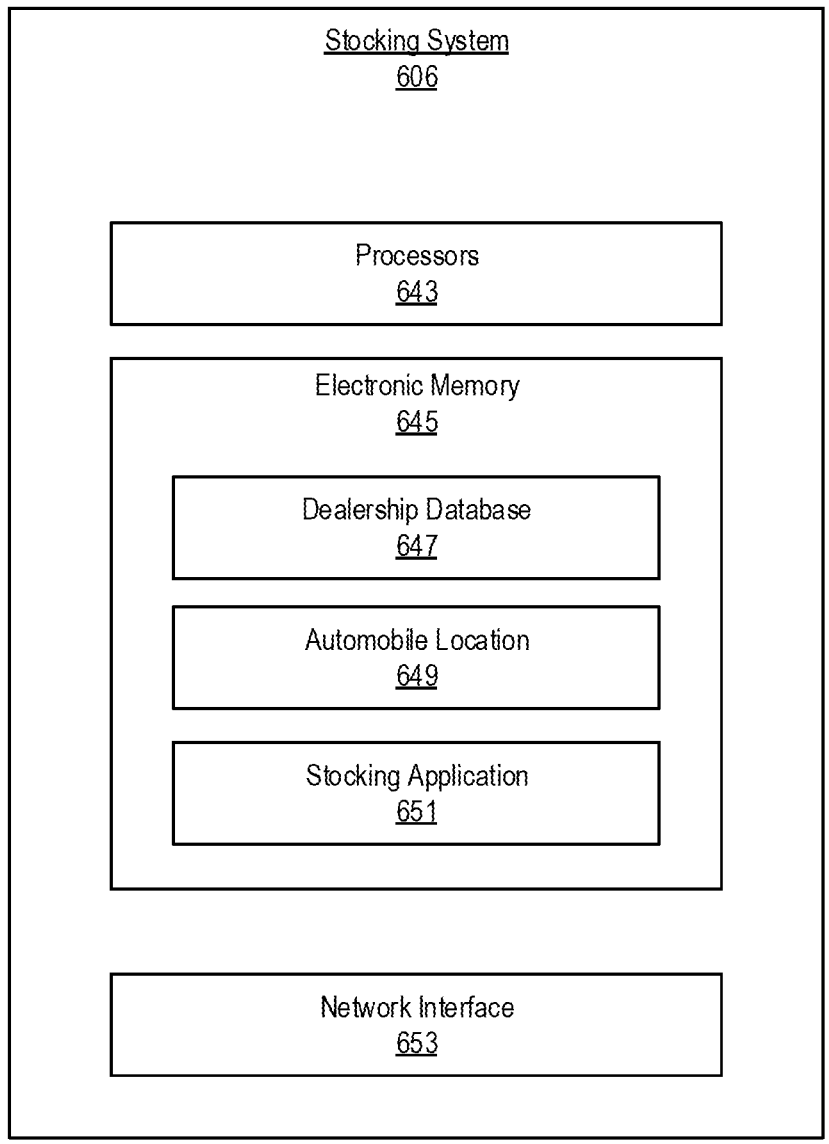
FIG. 6 is a block diagram of a stocking system according to one embodiment.

FIG. 6 is a block diagram of a stocking system according to one embodiment. The stocking system 606 is analogous to stocking system 106 in FIG. 1. The stocking system 606 can include a plurality of computing devices each of which may include one or more processors 643, electronic memory 645, and a network interface 653. The electronic memory 645 may store a dealership database 647, a location of a plurality of automobiles 649, and a stocking application 651.

The stocking application 651 can receive, via the network interface 653, the location of an automobile 649. The stocking application 651 can store the automobile's location 649 in the electronic memory 645. The stocking application 651 can interpret, via a computing device, whether the automobile has arrived at a dealership.

The stocking application 651 can update, via the computing device, the plurality of attributes of the dealerships which are stored in the dealership database 647. The dealership database 647 can store a location of the dealership, a plurality of GPS coordinates and/or RFID coordinates of the dealership, a delivery schedule of the dealership, an inventory list of the dealership, and/or identifying features of the WLAN of the dealership, among other data associated with the dealership.

The stocking application 651 can determine whether the automobile has arrived at the dealership by comparing the location of the automobile 649 to the location of the dealership stored in the dealership database 647. The stocking application 651 can inform the dealership of the arrival of the automobile at the dealership.

FIG. 7 is a flowchart of a method for stocking an automobile according to one embodiment. The method 760 includes reading 762 the location of the automobile in the electronic memory. The method 760 also includes comparing 764, via one or more processors, the location of the automobile with the location of the dealership to determine whether the automobile has arrived at the dealership.

The method 760 also includes notifying 766, via the network interface, the stocking system that the automobile has arrived at the dealership. The dealership can check-in the automobile. Checking-in the automobile can include the dealership verifying that the automobile has arrived at the dealership and that the automobile is in a satisfactory condition. The vehicle can be in a satisfactory condition if the automobile meets a standard outlined in a purchase agreement of the automobile.

The method 760 also includes receiving 768 a notification, via the network interface, from the dealership that the automobile is checked-in. The method 760 can also include stocking the automobile at the dealership by adding the automobile to the inventory list.

In a number of embodiments the notice that the automobile has arrived at the dealership is automatic. That is, the notice can be provided to the dealership without a user's interaction. That is, the automatic notice is provided to the stocking system without a user's input. The user can include users of the stocking system and/or users of the dealership. For example, the automatic notice can be provided to the dealership without a representative of the dealership prompting and/or requesting the automobile's location and/or whether the automobile has arrived at the dealership.

In some embodiments, the communication device communicates with the automobile via a WiFi connection. The communication device can communicate with the automobile to retrieve a location of the automobile. In other embodiments, the communication device is integrated into the automobile. For example, the communication device can be an OEM part. The communication device can also be coupled to the automobile via an OBD port.

A network interface of the automobile and/or the communication device can connect the automobile and/or the communication device to the Internet via a cellular connection. The network interface can be used to communicate with the stocking system.

The stocking system can list the automobile as being in stock in response to receiving the notification. That is, the stocking system and/or the dealership can list the automobile as being in stock in response to the automobile being accepted by the dealership.

FIG. 8 is a flowchart of a method for stocking an automobile according to one embodiment. The method 870 includes receiving 872, via a network interface, a location of the automobile, wherein the automobile provided the location. The method 870 also includes determining 874 whether the automobile is within a perimeter based on the location of the automobile and notifying 876, via a network interface, a dealership that the automobile is within the perimeter. The method 870 also includes receiving 878 a notification, via the network interface, from the dealership that the automobile is checked-in.

In a number of examples, the perimeter can be a geo-fence and/or a different type of fence that can interact with the dealership, the automobile, and/or the stocking system. The geo-fence can define a plurality of boundaries. The plurality of boundaries can surround a dealership. The plurality of boundaries can also and/or instead surround an intake location of the dealership.

FIG. 9 is a flowchart of a method for stocking an automobile according to one embodiment. The method 980 includes receiving 982, via one or more access points of a WLAN operating on the premises of the dealership, a request to connect an automobile to the WLAN and identifying 984 the automobile based on the request to connect the automobile to the WLAN. The method 980 also includes determining 986 whether the identified automobile is in stock at the dealership and stocking-in 988 the automobile based on a determination that the automobile is not in stock at the dealership.

The method 980 can also include receiving, via the one or more access points, automobile data for the automobile. The automobile data can include an identification of the automobile, a location from which the automobile is being transported, and/or a location to which the automobile is being transported. The automobile data can include a make and model of the automobile. The automobile data can include a vehicle identification number (VIN) number of the automobile, among other possible types of data that can describe the automobile such as a location of the automobile. In some embodiments the automobile can be identified based on the automobile data.

The automobile can include a communication device for communicating with the one or more access points of the WLAN. In a number of embodiments, the automobile can be stocked-in based on a notification that the automobile has arrived at the dealership.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus to integrate into an automobile, comprising:
   a network interface to communicate with an automobile stocking system, the automobile stocking system to communicate with computing devices of a plurality of automobile dealerships;
   one or more sensors to sense and provide data related to a location of the automobile;
   one or more processors to receive the data related to the location of the automobile; and
   electronic memory accessible by the one or more processors, the electronic memory to store the data related to the location of the automobile, the electronic memory also including processor-readable instructions stored thereon, the processor-readable instructions to instruct the one or more processors to:
      determine whether the automobile has arrived at one of the plurality of automobile dealerships based on the data related to the location of the automobile, the automobile scheduled to be delivered to the one of the plurality of automobile dealerships and stocked by adding the automobile to a for sale inventory of the one of the plurality of automobile dealerships; and
      control the network interface to notify the automobile stocking system that the automobile has arrived at the one of the plurality of dealerships responsive to a determination that the automobile has arrived at the one of the plurality of automobile dealerships.

2. The apparatus of claim 1, wherein:
   the one or more sensors comprise a global positioning system (GPS) sensor;
   the data related to the location of the automobile includes GPS data indicating GPS coordinates of the automobile; and
   the processor-readable instructions are further to instruct the one or more processors to determine whether the automobile has arrived at the one of the plurality of dealerships by comparing the GPS coordinates of the automobile to GPS coordinates of the plurality of dealerships stored on the electronic memory.

3. The apparatus of claim 2, wherein the GPS coordinates of the plurality of dealerships stored on the electronic memory comprise a plurality of points for at least one of the plurality of dealerships, the plurality of points defining premises of the at least one of the plurality of dealerships.

4. The apparatus of claim 2, wherein the GPS coordinates of the plurality of dealerships stored on the electronic memory comprise a single point corresponding to a location of at least one of the plurality of dealerships.

5. The apparatus of claim 1, wherein the one or more sensors comprise a wireless local area network (WLAN) interface to identify the location of the automobile at the one of the plurality of automobile dealerships by connecting to a WLAN access point located at the one of the plurality of automobile dealerships.

6. The apparatus of claim 1, wherein the apparatus includes an original equipment manufacturer (OEM) part.

7. The apparatus of claim 1, further comprising a connector to couple the one or more processors to the automobile via an on-board diagnostic (OBD) port.

8. The apparatus of claim 1, wherein the network interface connects to the Internet via a cellular connection.

9. The apparatus of claim 1, wherein the automobile stocking system lists the automobile as being in stock at the one of the plurality of dealerships in response to receiving the notification.

10. A method for stocking an automobile, the method comprising:
    receiving, from a device integrated into the automobile via at least one network interface of a computing device of an automobile stocking system, a location of the automobile, the automobile scheduled to be delivered to a dealership of one or more dealerships and stocked by adding the automobile to a for sale inventory of the dealership;
    determining whether the automobile has arrived at the dealership based on the location of the automobile received from the device integrated into the automobile;
    notifying, by the automobile stocking system, via the at least one network interface, a computing device of the dealership that the automobile has arrived at the dealership; and
    receiving a notification, at the automobile stocking system, via the at least one network interface from the dealership that the automobile is checked-in to the dealership.

11. The method of claim 10, wherein the at least one network interface communicatively connects the computing device of the automobile stocking system to devices of a plurality of different dealerships.

12. The method of claim 11, further comprising maintaining inventory lists for each of the plurality of different dealerships at the automobile stocking system.

13. The method of claim 11, wherein the location of the automobile received from the device integrated into the automobile includes an identification of a wireless local area network access point that is known by the device of the automobile stocking system to be located at the dealership.

14. The method of claim 12, wherein the location of the automobile received from the device integrated into the automobile includes global positioning system coordinates of the automobile.

15. A non-transitory computer-readable storage medium having stored thereon instructions that, when implemented by a computing device of an automobile dealership, cause the computing device to perform operations for stocking an automobile, the operations comprising:
    receiving, via one or more access points of a wireless local area network (WLAN) operating on the premises of the automobile dealership, a request to connect a device integrated into the automobile to the WLAN upon arrival of the automobile within communication range of one of the one or more access points, the automobile scheduled to be delivered to the automobile dealership and stocked by adding the automobile to a for sale inventory of the automobile dealership;

identifying the automobile based on identification information received in the request to connect the automobile to the WLAN;

determining whether the identified automobile is already listed as in stock at the dealership; and communicating with a computing device of an automobile stocking system in communication with the device integrated into the automobile to add the automobile to the for sale inventory of the dealership.

16. The computer-readable storage medium of claim 15, wherein the device integrated into the automobile is configured to transmit location data indicating that the automobile has arrived at the dealership to the computing device of the automobile stocking system via the WLAN.

17. The computer-readable storage medium of claim 15, wherein communicating with a computing device of an automobile stocking system comprises receiving a notification from the automobile stocking system that the automobile has arrived at the dealership.

18. The computer-readable storage medium of claim 15, wherein communicating with a computing device of an automobile stocking system comprises transmitting a notification to the automobile stocking system that the automobile has been checked-in to the dealership.

19. The computer-readable storage medium of claim 15, further comprising receiving a notification from the automobile via the one or more access points that the automobile has arrived at the dealership.

20. The computer-readable storage medium of claim 19, further comprising adding the automobile to the inventory of the dealership based on the notification that the automobile has arrived at the dealership.

\* \* \* \* \*